United States Patent [19]

Wells

[11] Patent Number: 5,071,293

[45] Date of Patent: Dec. 10, 1991

[54] FEED RATE REGULATOR FOR A HAND-HELD DRILL

[75] Inventor: Wesley G. Wells, Des Peres, Mo.

[73] Assignee: McDonnell Douglas Corporation, Long Beach, Calif.

[21] Appl. No.: 429,964

[22] Filed: Oct. 30, 1989

[51] Int. Cl.$^5$ .............................................. B23B 45/00
[52] U.S. Cl. ...................................... 408/112; 408/14; 408/241 S; 408/72 B; 408/241 B
[58] Field of Search ................. 408/10, 97, 72 B, 112, 408/96, 95, 14, 51, 241 S, 119, 111, 241 B, 130, 80, 81, 74, 84; 92/13, 13.7, 13.8

[56] References Cited

U.S. PATENT DOCUMENTS

| | | | |
|---|---|---|---|
| 2,669,889 | 2/1954 | Huller | 408/72 B X |
| 2,994,235 | 8/1961 | Rise | 408/112 |
| 3,397,600 | 8/1968 | Wells | 408/112 |
| 4,534,682 | 8/1985 | Carlson | 408/14 |

FOREIGN PATENT DOCUMENTS 2108020  5/1983  United Kingdom .................. 408/95

OTHER PUBLICATIONS

Promotional pamphlet for Deschner Kinecheck ®.

Primary Examiner—Larry I. Schwartz
Assistant Examiner—R. L. Schultz
Attorney, Agent, or Firm—Gregory A. Cone; John P. Scholl; James M. Skorich

[57] ABSTRACT

Barrel casing attached to the housing of a hand-held drill. A retractable guide arm is cantilevered from one end of the barrel casing. The cantilevered end of the guide arm has a passageway for the drill bit, and thereby guides it. A rate limiter is attached to the other end of the barrel casing and in axial alignment with it. On the inside of the barrel casing, the rate limiter is connected to the guide arm by abutment.

9 Claims, 1 Drawing Sheet

FEED RATE REGULATOR FOR A HAND-HELD DRILL

BACKGROUND OF THE INVENTION

1. Field of the Invention

The present invention relates to a feed rate regulator for a drill and, more particularly, to a hydraulic feed rate regulator for a portable, hand-held drill.

2. Prior Art

Modern flight vehicles are making ever increasing use of bonded composite laminates to decrease structural weight while providing strength at high temperatures. The assembly of flight vehicles requires that holes be drilled in the composite laminates to accommodate bolts and other fasteners.

When the drill bit reaches the blind or back surface of the thickness being bored, there is a surge or sudden movement of the drill bit due to the precipitous decrease in the resisting force. More particularly, the resisting force decreases approximately 50 percent (50%) when the tip of the drill bit penetrates the thickness of the part being drilled and breaches the back surface. When the part is made from metal, the sudden surge of the drill bit may cause a slight burr which can be easily removed with a file However, when the material is a composite laminate such a surge commonly causes delamination of several plies adjacent the drilled hole.

Repair of the composite plies requires the application of an epoxy adhesive followed by the continuous application of pressure by means of clamps while the epoxy adhesive cures. The hole must then be bored again because the epoxy adhesive invariably flows into and partially fills the opening. The repair process for a composite laminate is thus a time-consuming procedure which is labor intensive, and therefore costly.

One solution to this problem is to bore the necessary holes in composite laminates with an automatic drilling machine having a controlled feed rate. Such a machine advances the drill bit a fixed distance per revolution of the drill bit. Appropriately setting the feed rate avoids surge and thus the problem of delamination adjacent the drill hole because the feed rate is a controlled constant.

However, drilling machines are very expensive, and thus require a significant capital investment. Additionally, the machines are large and bulky, requiring much floor space. Furthermore, it is difficult and sometimes impossible to use the machines to drill holes in surfaces which are not readily accessible.

The operator of a drilling machine must be trained in its use. Furthermore, its weight and bulk made it impractical to transport a drilling machine to scattered or distant locations to perform repairs in the field. The use of a drilling machine is thus typically limited to factories where flight vehicles are assembled.

SUMMARY OF THE INVENTION

Briefly, the present invention is a barrel casing clamped to the housing of a portable, hand-held drill. A guide arm cantilevers from one end of the barrel casing. The guide arm has an opening containing a drill bushing through which the drill bit passes, and functions as a guide for the drill bit. The guide arm can partially retract into the barrel casing, and includes a return spring.

In operation, the end of the drill bushing is placed against the surface through which a hole is to be drilled. As force is applied by the operator against the surface, the guide arm retracts into the barrel casing, and the drill bit extends from the drill bushing in the end of the guide arm and into the surface being drilled.

A rate limiter is attached to the other end of the barrel casing and is in axial alignment with it. The guide arm is connected to the rate limiter by abutment so that the rate of retraction of the guide arm is limited. When the drill bit reaches the back side of the part being drilled and the resistance force of the part acting against the drill bit suddenly drops, the rate limiter restrains the forward movement of the drill and thus the drill bit, keeping the feed rate of the drill constant and thereby preventing the drill bit from accelerating or surging. The feed rate regulator of the present invention thus prevents the drill bit from causing delamination of the composite laminate adjacent the drilled hole.

A stop screw having an adjustable axial location and situated inside the barrel casing, limits the distance the drill bit can extend through the drilled hole. This feature protects objects or surfaces located in close proximity to the back side of the hole being drilled from being damaged by the drill bit.

The present invention is relatively inexpensive and, as it is used in conjunction with a hand-held drill, it is light and portable. Its relatively small size and portability allows it to be used to drill holes that are difficult to reach. In addition, it can be used in the field for repairs, thus eliminating the need for flight vehicles to be returned to a factory where an automated drilling machine would be located.

As anyone able to use a hand-held drill can use the present invention, the training required of the operator is minimal. The present invention does not take up floor space, and thus several operators may each use, simultaneously, a hand-held drill equipped with the feed rate regulator of the present invention to drill several holes at different locations on a flight vehicle. This serves to speed manufacture or repair of a flight vehicle.

The use of the present invention virtually eliminates damage to composite laminate parts otherwise caused by using hand-held drills to drill holes in them. The present invention thus realizes the benefits of portability and cost savings attendant to the use of a hand-held drill, while avoiding the bulk, weight, and capital investment of an automated drilling machine.

DETAILED DESCRIPTION OF THE DRAWINGS

DETAILED DESCRIPTION OF THE INVENTION AND DRAWINGS

Figure 1:
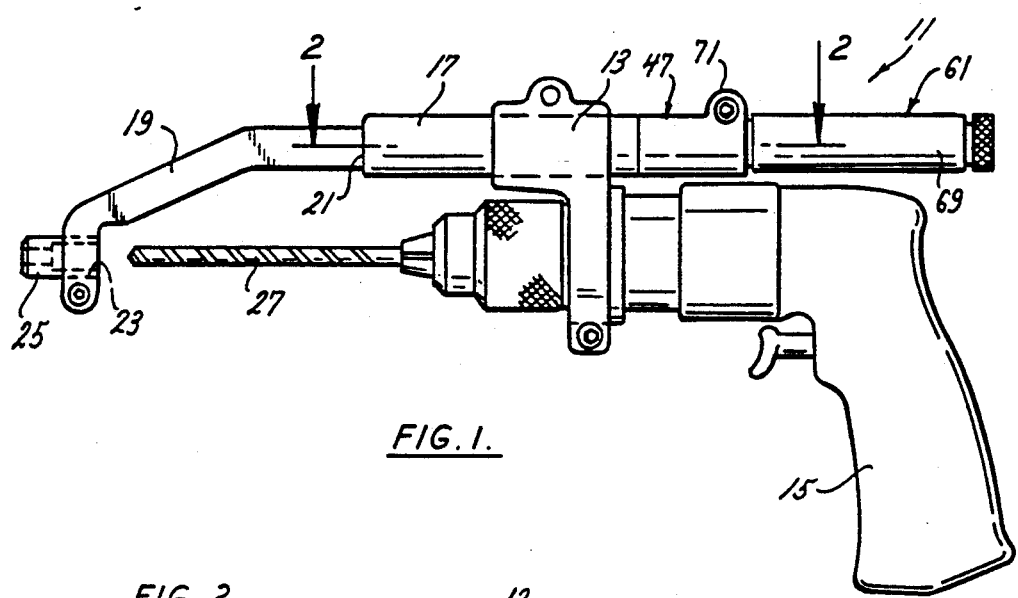
FIG. 1 is a side view of the preferred embodiment of the present invention.

Reference is now made to the drawings, which illustrate feed rate regulator 11, the preferred embodiment of the present invention. More particularly, FIG. 1 shows a side view of feed rate regulator 11 attached by means of yoke 13 to hand-held drill motor 15.

The essential parts of feed rate regulator 11 are contained within barrel casing 17, or extend therefrom. Guide arm 19 cantilevers from end 21 of barrel casing 17. Opening 23 in the end of guide arm 19 contains drill bushing 25. Drill bit 27 passes through drill bushing 25, and is guided by it.

Figure 2:
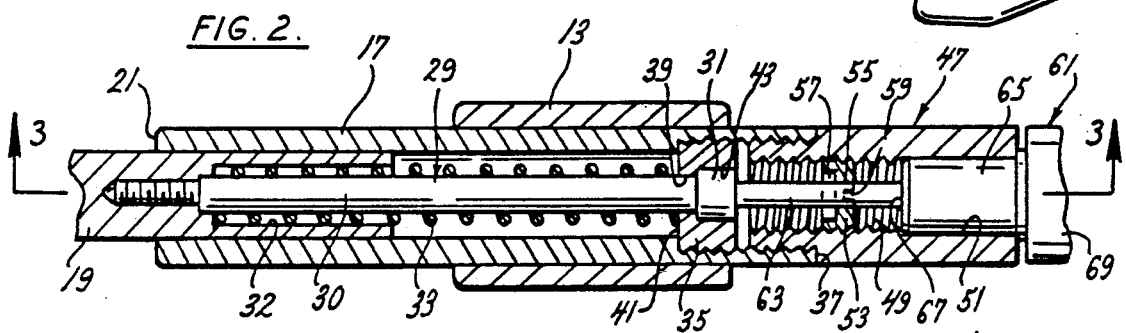
FIG. 2 is sectional view taken along line 2—2 of FIG. 1, and shows the guide arm in its fully extended, at-rest position with the head of the shoulder screw abutting the adjustment plug.
Figure 3:
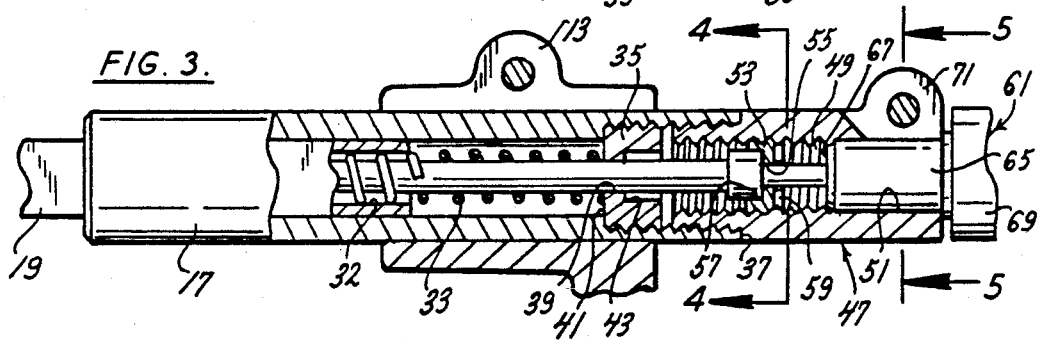
FIG. 3 is a sectional view taken along line 3—3 of FIG. 2. However, this figure shows the guide arm retracted its maximum distance into the barrel casing, and thus shows the shoulder screw abutting the stop screw.

As shown in the sectional views provided by FIGS. 2 and 3, guide arm 19 can retract into barrel casing 17. Shoulder screw 29 is comprised of shank 30, and screw head 31. Shoulder screw 29 is threadably engaged with the end of guide arm 19 which extends into barrel casing 17.

Spring seat 32 is formed in the end of guide arm 19 which extends into barrel casing 17. Return spring 33 is coiled around shank 30, and has one of its ends resting within spring seat 32 and thereby abutting the end of guide arm 19.

Adjustment plug 35 is threadably engaged within end 37 of barrel casing 17. Adjustment plug 35 has annular passageway 39 through its center. Annular passageway 39 has a diameter large enough to allow the slideable passage of shank 30, but smaller than the diameter of screw head 31. Adjustment plug 35 is positioned so that its annular surface 41 faces away from end 37 of barrel casing 17, and head seat 43 faces towards end 37 barrel casing 17. Return spring 33 is contained in between spring seat 32 and annular surface 41 of adjustment plug 35, so that retraction of guide arm 19 causes the compression of return spring 33 and generates an opposing spring force tending to return guide arm 19 to its at-rest position.

Head seat 43 is an annular concavity, and has a diameter sufficient to seat screw head 31. As passageway 39 is of a diameter less than that of screw head 31, the axial movement of screw head 31 towards end 21 of barrel casing 17, and therefore the movement of shoulder screw 29 in that direction, is limited by the axial position of adjustment plug 35. The at-rest position of guide arm 19 relative to drill bit 27 can thus be adjusted by adjusting the axial position of adjustment plug 35.

Mounting assembly 47 is threadably engaged with end 37 of barrel casing 17. Mounting assembly 47 contains annular threaded passageway 49 and cylindrical seat 51.

Figure 4:
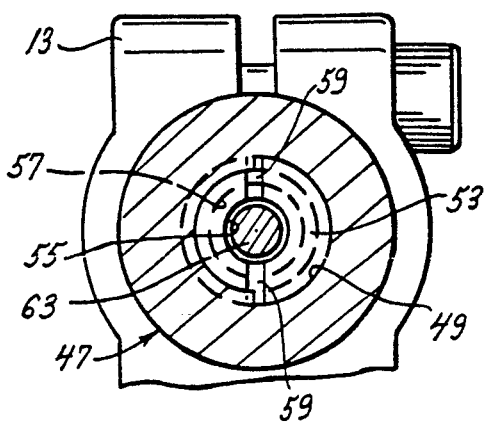
FIG. 4 is a sectional view taken along line 4—4 of FIG. 3.
Figure 5:
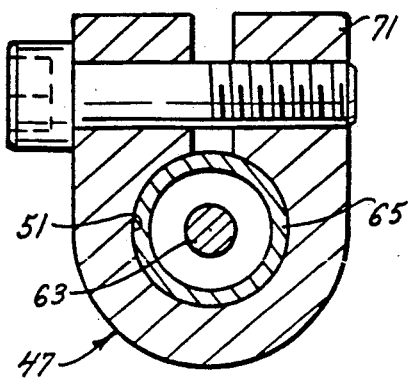
FIG. 5 is a sectional view taken along line 5—5 of FIG. 3.

As particularly shown in FIG. 4, stop screw 53 has a threaded outer diameter, annular passageway 55, head seat 57, and slot 59. Stop screw 53 is threadably engaged with and located in threaded passageway 49 of mounting assembly 47. Slot 59 is provided so that a blade screwdriver can be used to locate stop screw 53 in the desired position. Head seat 57 accommodates screw head 31.

Rate limiter 61 is a cylindrical hydraulic damper. The rate limit of rate limiter 61 is adjustable, although in other embodiments of the present invention the rate limit may be fixed. Rate limiter 61 is comprised of plunger rod 63, mounting collar 65, annular face 67, and hydraulic cylinder 69. Rate limiter 61 is secured in cylindrical seat 51 of mounting assembly 47 by means of clamp 71 being fastened about mounting collar 65. Plunger rod 63 passes through annular passageway 55 in stop screw 53. The end of plunger rod 63 abuts screw head 31.

The position of adjustment plug 35 controls the distance that guide arm 19 extends from barrel casing 17 when guide arm 19 is at rest; that is, when there is no force acting against the projecting end of guide arm 19. The position of stop screw 53 controls the stroke of shoulder screw 29; that is, the maximum distance guide arm 19 can retract when a force is applied against the projecting end of guide arm 19 of sufficient magnitude to overcome the cumulative resisting forces of return spring 33 and rate limiter 61.

FIG. 2 shows the position of shoulder screw 29 when guide arm 19 is in its at-rest position. FIG. 3 shows shoulder screw 29 retracted against stop screw 53, and thus shows guide arm 19 retracted its full stroke for the illustrated setting of stop screw 53. Stop screw 53 may be removed from threaded passageway 49 should it be desired to operate feed rate regulator 11 with the maximum possible stroke for guide arm 19. In such a configuration, the stroke of guide arm 19 would be limited by the abutment of screw head 31 with annular face 67 of mounting collar 65.

In operation, a drill template having a guide hole at each location where a hole is to be drilled is placed over the surface of the thickness to be drilled. Drill bushing 25 is sized so that it fits into the guide hole. Drill bit 27 is then positioned by placing drill bushing 25 into each guide hole, and in abutment with the thickness to be drilled.

The operator applies force against the abutting thickness through guide arm 19 while actuating drill motor 15. The resisting force of the thickness is transmitted from guide arm 19, through shoulder screw 29 and plunger rod 63, to hydraulic cylinder 69. Drill bushing 25 abuts the surface adjacent the hole being drilled, while drill bit 27 proceeds through the thickness and guide arm 19 moves relative to drill bit 27 by retracting into barrel casing 17. Rate limiter 61 limits the rate of translation of guide arm 19 relative to drill bit 27, and thereby limits the rate at which drill bit 27 can proceed through drill bushing 25 in guide arm 19, and thus through the thickness being drilled. This parameter is also known as the feed rate.

When drill bit 27 penetrates through the thickness being drilled to its back surface, feed rate regulator 11 prevents drill bit 27 from surging, and thereby protects the thickness being drilled from the attendant consequences. More particularly, when the thickness being drilled is composed of a bonded composite laminate, such a surge would cause delamination of the plies adjacent the bored hole.

Changes in modifications in the specifically described embodiments can be carried out without departing from the scope of the invention, which is intended to be limited only by the scope of the appended claims.

What is claimed is:

1. A feed rate regulator for attachment to a drill comprising:
   a casing adapted for attachment to a drill;
   an arm projecting from said casing and being slideably moveable into and out of said casing;
   a hydraulic rate limiter having a plunger rod projecting therefrom which is slideably moveable into and out of said rate limiter;
   said rate limiter being adapted for attachment to said casing;
   said arm including a shoulder screw; and
   said plunger rod being axially aligned with said shoulder screw and abutting an end of said shoulder screw when said rate limiter is attached to said casing.

2. The feed rate regulator recited in claim 1 wherein:
said shoulder screw is comprised of a shank and a head;
said limit means is comprised of a plug located within said casing;
said plug having a plug opening;
said shank passing through said plug opening; and
said plug opening being sized to prevent the passage therethrough of said head.

3. The feed rate limiter recited in claim 2 wherein:
said stop means is comprised of a stop screw located inside of said casing; and
said stop screw having a stop screw opening for allowing the passage therethrough of said plunger rod, with said stop screw opening being sized to prevent the passage therethrough of said head.

4. The feed rate regulator recited in claim 3 wherein:
said arm includes a spring seat; and
said return means is comprised of a coil spring being coiled about said shank and being compressed in between and abutting said spring seat and said plug.

5. The feed rate regulator recited in claim 1 wherein:
said arm is in an at-rest position when it is projected its maximum distance out of said casing; and further comprising
return means for returning said arm to said at-rest position from any other position.

6. The feed rate regulator recited in claim 5 further comprising limit means for varying the maximum distance said arm can project from said casing.

7. The feed rate regulator recited in claim 6 further comprising stop means for varying the maximum distance said arm can retract into said casing.

8. The feed rate regulator recited in claim 1 further comprising means included in said arm for guiding said drill towards a workpiece.

9. The feed rate regulator recited in claim 8 wherein said guide means is an opening in an end of said arm for allowing the passage of a part of said drill.

* * * * *